United States Patent
Rowen et al.

(10) Patent No.: US 9,619,205 B1
(45) Date of Patent: Apr. 11, 2017

(54) SYSTEM AND METHOD FOR PERFORMING FLOATING POINT OPERATIONS IN A PROCESSOR THAT INCLUDES FIXED POINT OPERATIONS

(71) Applicant: Cadence Design Systems, Inc., San Jose, CA (US)

(72) Inventors: Christopher Rowen, Santa Cruz, CA (US); Teodur Doru Cuturela, San Jose, CA (US); Xiaoguang Lv, Beijing (CN); Dan Nicolaescu, Kalamazoo, MI (US); Pushkar Patwardhan, Cupertino, CA (US); Manish Ashok Paradkar, Pune (IN); Pranava Tummala, Pune (IN)

(73) Assignee: Cadence Design Systems, Inc., San Jose, CA (US)

( * ) Notice: Subject to any disclaimer, the term of this patent is extended or adjusted under 35 U.S.C. 154(b) by 311 days.

(21) Appl. No.: 14/295,818

(22) Filed: Jun. 4, 2014

(51) Int. Cl.
*G06F 7/483* (2006.01)

(52) U.S. Cl.
CPC .................................. *G06F 7/483* (2013.01)

(58) Field of Classification Search
None
See application file for complete search history.

(56) References Cited

U.S. PATENT DOCUMENTS

| | | | |
|---|---|---|---|
| 7,242,414 B1 * | 7/2007 | Thekkath | G06F 9/30014 345/623 |
| 8,788,549 B2 * | 7/2014 | Padaki | G06F 7/483 708/208 |
| 2006/0095490 A1 * | 5/2006 | Hansen | G06F 7/4806 708/400 |

* cited by examiner

*Primary Examiner* — Michael D Yaary
(74) *Attorney, Agent, or Firm* — Schwegman Lundberg & Woessner, P.A.

(57) ABSTRACT

A computer implemented method for performing floating point operations as part of a processor architecture that also includes fixed point operations is disclosed. The computer implemented method includes providing a group of instructions within the fixed point architecture. A floating point value is split between two programmer visible registers. In a system and method in accordance with the present invention a new form of floating point representation and associated processor operations, including efficient complex number representations and operations are utilized.

23 Claims, 9 Drawing Sheets

| Exponent (vsa) | Mantissa (vec) | Interpretation as real or as larger element of complex pair | Interpretation as smaller element of complex pair |
| --- | --- | --- | --- |
| exp=63 | Any | Zero | Zero |
| -64<exp<63 | 0 | Not standard value | Zero |
| -64<exp<63 | Unnormalized | Not standard value | Normal Number |
| -64<exp<63 | Normalized | Normal Number | Normal Number |
| exp = -64 | Any | Big Value | Big Value |

FIG. 2

| Multiply | Zero | Normal | Big Value |
|---|---|---|---|
| Zero | Zero | Zero | Big Value |
| Normal | Zero | Normal – except exponent overflow (value <-64), then Big Value or exponent underflow (value >63), then Zero (and set flush-to-zero flag). | Big Value |
| Big Value | Big Value | Big Value | Big Value |

FIG. 3

| Add | Zero | Normal | Big Value |
|---|---|---|---|
| Zero | Zero | Normal | Big Value |
| Normal | Normal | Normal – except exponent overflow (value <-64), then Big Value or exponent underflow (value >63), then Zero (and set flush-to-zero flag). | Big Value |
| Big Value | Big Value | Big Value | Big Value |

FIG. 4

SYSTEM AND METHOD FOR PERFORMING FLOATING POINT OPERATIONS IN A PROCESSOR THAT INCLUDES FIXED POINT OPERATIONS

FIELD OF THE INVENTION

The present invention relates generally to signal processing systems and more to improving the performance of such signal processing systems.

BACKGROUND

Applications for baseband signal processing face a fundamental tradeoff between computing accuracy and computing efficiency. On one hand, maximizing numerical accuracy improves the performance of the wireless connections and ease of implementing theoretical algorithms on real semiconductor devices. However, maintaining high numerical precision requires either/or wide data words and arithmetic logic units or complex representations like mantissa+exponent floating point representations that adversely affect computing efficiency.

The IEEE 754 floating point double precision standard is commonly used algorithm development, because it imposes very little precision loss due to representation. It is commonly implemented in general-purpose processors and some specialized processors such as DSPs and GPUs. The price of this sophistication is expensive computation, measured either by hardware costs (number of gates, area of semiconductor logic for implementation) or by power (energy per operation) relative to performance.

For example, representations of the IEEE Standard for Floating-Point Arithmetic (IEEE 754) which are commonly 32-bit for "single precision" and 64-bits for "double precision", a complex number floating point multiply-add follows the below identified sequence of basic operations of for input A and B into an accumulator C.

$1^{st}$ operation) The input A real mantissa is multiplied with input B real mantissa, and the input A imaginary mantissa is multiplied with the input B imaginary mantissa. The input A real mantissa is multiplied with the input B imaginary mantissa. Finally, the input A imaginary mantissa is multiplied with the input B real mantissa.

$2^{nd}$ operation) The input A real exponent is added with the input B real exponent. The input A imaginary exponent is added with the input B imaginary exponent.

$3^{rd}$ operation) Compare the exponents. If sum of real exponents is smaller than the sum of imaginary exponents shift the product of real mantissa down by the difference in those sums, otherwise shift the product of imaginary exponents down by the difference in those sums, and subtract the mantissa products to form a real mantissa product. If the sum of input A real exponents plus input B imaginary exponents is smaller than the sum of the input A imaginary exponents plus input B real exponents, then a product of input A real mantissas and the input B imaginary mantissa is shifted down by a difference of the sums of the mantissa, otherwise shift the product of input A imaginary mantissa and the input B real mantissa down by the difference in the sum of the mantissas, and add the mantissa products to form the imaginary mantissa.

$4^{th}$ operation) Set the exponent for the real product to the greater of input A real plus input B real or input A imaginary plus input B imaginary. Set the exponent for the imaginary product to the greater of input A. real plus input B imaginary and input A imaginary plus input B real.

$5^{th}$ operation) Compare the exponent of the real product with the exponent of the accumulator C real. If the real product exponent is smaller than the accumulator, shift the product mantissa down by the difference between the exponent of the real product and the exponent of the accumulator; otherwise shift the accumulator C mantissa down by the difference. Next add the mantissas of the real product and the accumulator C. Select the larger exponent as a result exponent.

Compare the exponent of the imaginary product with exponent of the accumulator C imaginary. If the imaginary product exponent is smaller than the accumulator C shift the product mantissa down by the difference, else shift the accumulator mantissa down by the difference. Next add the mantissas of the imaginary product and the accumulator C. Select the larger exponent as a result exponent.

$6^{th}$ operation) Normalize the real mantissa by shifting up or down and adjust the real exponent by the amount of shift. Normalize the imaginary mantissa by shifting up or down and adjust the imaginary exponent by the amount of shift. Accordingly as is seen, to perform a multiply/add operation typically requires an operation sequence of multiply-shift-add-shift-add-shift-add on each component of a complex value.

As mentioned before, this sequence of operations have to be performed every time on complex numbers which affects the computing efficiency of the processing system. Accordingly what is needed is a system and method that addresses the above identified issues. The system and method must be easily implemented, adaptable and cost effective. The present invention addresses the above identified issues.

SUMMARY

A computer implemented method and system for performing floating point operations as part of an processor architecture that also includes fixed point operations is disclosed.

In a first aspect, the computer implemented method and system includes providing an group of instructions within the fixed point architecture. A floating point value is split between two program visible registers.

In a second aspect, the computer implemented method and system includes providing a group of instructions within the fixed point architecture that includes a floating point representation which includes a common exponent for real and imaginary components of the floating point representation. One of the real and imaginary components is normalized.

In a third aspect, the computer implemented method and system includes providing a group of instructions within the fixed point architecture that includes a multiply add operation within the floating point capability. An accumulator with lazy normalization is utilized to simplify the multiply add operation.

In a fourth aspect, the computer implemented method and system includes providing a group of instructions within the fixed point architecture that uses a complex number multiply-add operation to perform a floating point add/subtract operation. Two multipliers per lane of a vector execution pipeline are utilized for a denormalization of the floating point add/subtract operation to implement the shifts on one or the other of two input mantissas from the multiply-add operation.

In a fifth aspect, the computer implemented method and system includes providing a group of instructions that includes special renormalization operations for reciprocal determinations.

In a sixth aspect, the computer implemented method and system includes providing a group of instructions within the fixed point architecture that includes an advanced precision floating point operations group. The advanced precision floating point operations group comprises three sub-groups of operations. One of the three sub-groups comprises multiply operations that write into a first programmer visible register within the fixed point architecture. A second of the three sub-groups of operations comprises shift-and-accumulate operations that utilizes the intermediate register as a source and performs a variable shift and add or subtract to or from a second programmer visible register within the fixed point processor architecture and a third of the three sub-groups of operations comprises helper operations to add and subtract shift amounts in a third programmer visible register within the fixed point architecture.

In a system and method in accordance with the present invention a new form of floating point representation and associated processor operations, including efficient complex number representations and operations are utilized.

BRIEF DESCRIPTION OF THE DRAWINGS

FIG. 2 illustrates an example of the floating point representations using a floating point format in accordance with an embodiment.

FIG. 3 illustrates how the number types participate in multiply operation using a floating point format in accordance with an embodiment.

FIG. 4 illustrates how the number types participate in addition and subtraction operations using a floating point format in accordance with an embodiment.

DETAILED DESCRIPTION

Figure 1:
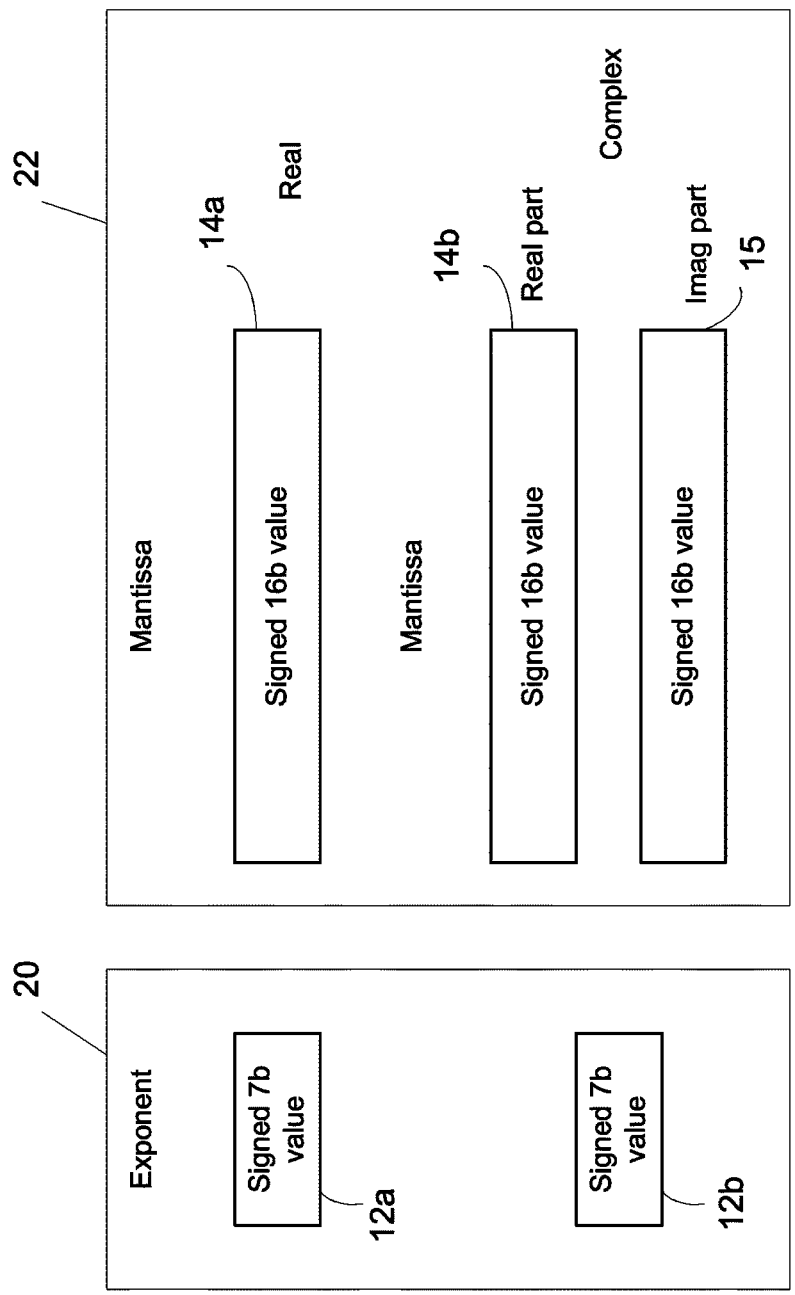
FIG. 1 illustrates an embodiment in which vectors of the precision floating values are represented as for example a 16-bit mantissa held in a vector register and a vector of 7-bit exponents are held in a vector shift amount (VSA) register.

The present invention relates generally to signal processing systems and more to improving the performance of such signal processing systems. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A system and method in accordance with the present invention provides a value representation and set of operations with three key attributes:

1. The system and method describes a true per value mantissa+exponent floating point representation to provide much better dynamic range than fixed point representations with the same number of bits. One typical implementation described in detail herein uses a 16-bit signed, normalized mantissa and a 7-bit power-of-two exponent for a total of 23 bits per real number value. This compares with IEEE 754 representations which are commonly 32-bit for "single precision" and 64-bits for "double precision", which requires an operation sequence which significantly affects computing efficiency.

2. The system and method in accordance with an embodiment simplifies a representation of complex values by implementing a single shared exponent value applied to both the real and imaginary components of the value, so that each complex value has one distinct exponent and two mantissas. The floating point value is split between a shift amount register and a fixed point data register. This representation enables streamlined implementation of key operations especially complex multiplication, because partial products do not require exponent-dependent normalization before summation.

In addition, a system and method in accordance with an embodiment can use a wide accumulator that typically does not need normalization after each addition. By minimizing the normalization after each addition the basic multiply-add operation sequence can be reduced to a multiply add-shift add operation rather than the multiply-shift-add-shift-add-shift-add operation utilized in conventional representations. In so doing, the hardware is streamlined, thereby reducing cost, latency and power, without significantly reducing numerical precision in signal processing systems that use complex number representation, such as wireless communications with multiple in multiple out (MIMO)-based communications algorithms.

3. The system and method provides a set of operations tuned for efficient implementation on modern communications-oriented (digital signal processing) DSP, using a combination of very wide instruction width (VLIW) and vector processing or Single Instruction Multiple Data (SIMD) architecture structures. To describe these features in more detail refer now to following description.

Baseline Fixed Point Architecture

A baseline fixed point architecture is needed to provide a group of instructions for floating point operations. The basic fixed point architecture operates in conjunction with an underlying vector/VLIW architecture which includes the following classes of operations, in addition to the floating point operations.

1. Vector data register file, including A entries, each S*N bits wide, where S is a typically a power-of-two. In an embodiment, S=32 and N=16 bits 2. A wide accumulator register file, including B entries, each S*W bits wide. In an embodiment, W=40 bits.

3. A shift/select register file, including C entries, each S*V bits wide. In an embodiment, V=7 bits.

4. An address/scalar register file, including D entries, each R bits wide. In an embodiment, R=32 bits.

5. A scalar operation set including memory operations, arithmetic, shift, logical and branch/jump/call operations the use the address/scalar register file.

6. A set of vector load and store operations that generate an address, often using one or more entries from the address register file, load or store a vector of S*N bits to or from the vector data register file, perhaps updating the address register file.

7. A set of data reorganization operations that can reorder the elements of one or more data vectors, controlled by either a fixed pattern or one controlled by the elements of a shift/select register file entry, or move data between among the various register files.

8. A set of fixed point computation operations that do add, subtract, comparison, multiply, divide and other arithmetic operations, shift operations, using immediate shift amount, or per element amount from the shift/select register file and logical operations.

Advanced Precision Floating Point Operations Group

The baseline fixed point architecture is utilized with an advanced precision floating operations group to provide the floating point operations. The advanced precision floating operations group is built around the following basic principles. Performing a floating point multiply operation typically requires a multiply-add, a shift, and an accumulation-add two less shift stages than for conventional floating point operations on complex values. Floating point operations also require parallel manipulation of the exponent (normalization shift amount). The advanced precision floating point operations group is broken into three distinct sub-groups, typically issued in parallel. The first sub-group of operations comprises multiply operations write into an intermediate register file. The second sub-group of operations comprises shift-and-accumulate operations that utilize the intermediate register as a source and performs a variable shift and add or subtract to or from an accumulator register file. The third sub-group of operations comprises helper operations to add and subtract shift amounts in a vector shift amount register file. To describe the features of the baseline architecture and the advanced precision floating point operations group of the present embodiment in more detail refer now to the following description in conjunction at the accompanying Figures.

Floating Point Operations

The advanced precision floating point operations group includes new sets of optimized operations for new classes of data representation of precision floating point number. In an embodiment, vectors of the precision floating values are represented as for example a 16-bit mantissa 14a, 14b and 15 held in a programmer visible register such as a vector register 22 and a vector of 7-bit signed value exponents 12a and 12b, held in another programmer visible register such as a vector shift amount (VSA) register 20 as shown in FIG. 1. The 16-bit mantissa in the vector register 22 holds a signed value 14a, 14b and 15 in the range of for example [0.5,1.0) in 16-bit or [−1.0,−0.5), respectively.

FIG. 2 illustrates an example of the floating point representations using a floating point format in accordance with an embodiment. The exponent is represented as the right shift amount that would convert the mantissa back to a fixed point value. The most positive VSA element value, for example in this embodiment 63, corresponds an exponent of $2^{-63}$. Any value with this exponent may be considered zero. The most negative VSA element value, −64, corresponds to an exponent of $2^{64}$. Note that this representation is the opposite of IEEE exponent representation, but may be converted easily for the representable range.

FIG. 3 illustrates how the number types participate in multiply operation using a floating point format in accordance with an embodiment. FIG. 4 illustrates how the number types participate in addition and subtraction operations using a floating point format in accordance with an embodiment.

The primary floating representation, for example the 16-bit mantissa+7-bit exponent floating point number, can represent the following values, where "Big Value" is special set of representations typically indicating large values above the range of directly representable values. "Big Value" serves as a form of infinity in many calculations. To describe the features of using this floating point format in a processing system refer now to the following description in conjunction with the accompanying figures.

In a system and method in accordance with the present invention, mantissas for real values are always normalized. Mantissa for complex values always have at least one value normalized, where the mantissa is a value in the range [−1.0 . . . 1.0). The sign of zero is not significant. The sign of Big Values is preserved in multiplication operations.

Figure 5:
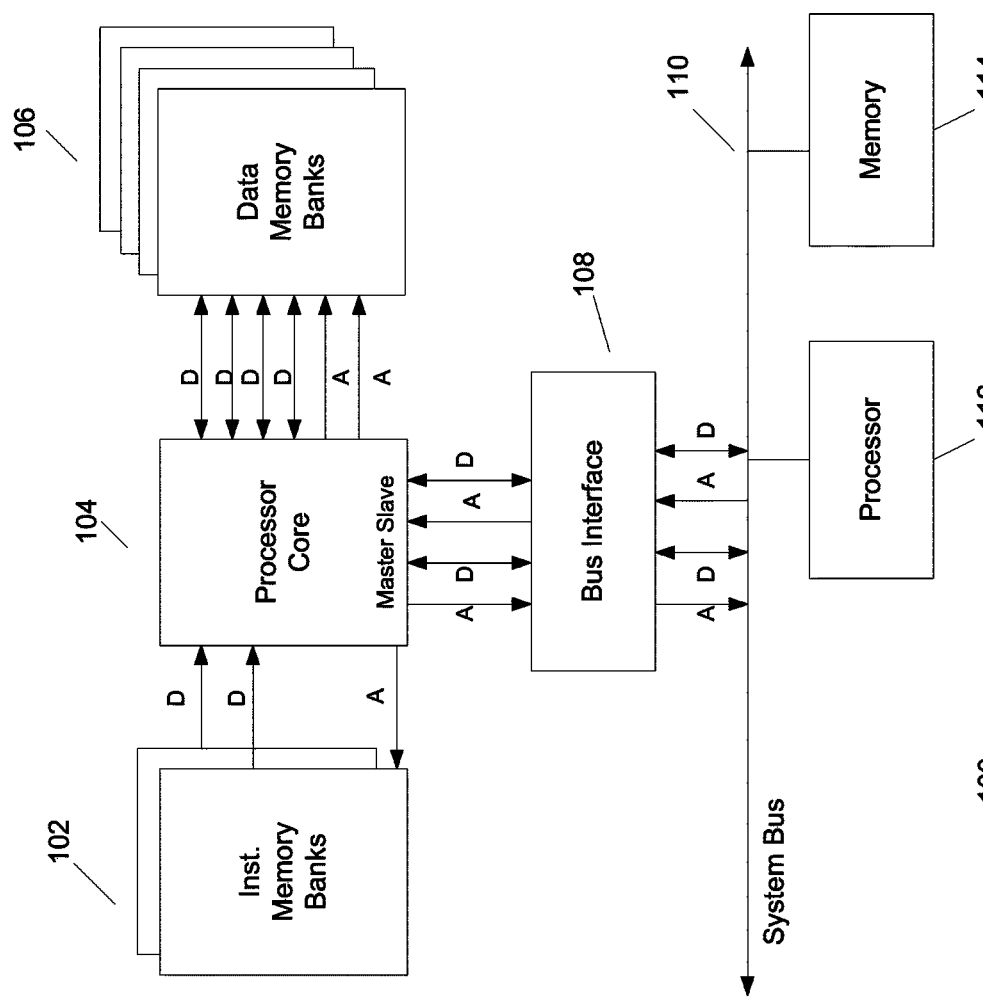
FIG. 5 is a block diagram of a fixed point processing system in accordance with the present invention.

FIG. 5 is a block diagram of a processing system 100 in accordance with the present invention. The processing system 100 includes a processor core 104 which receives data and addresses from a plurality of instruction memory banks 102 and a plurality of data memory banks 106. The processor core 104 exchanges address and data signals with the bus interface 108. The bus interfaces 108 exchanges address and data signals over a bus 110 with for example an external processor 112 and memory 114. A floating point architecture can be implemented in the processor core 104 in either scalar or vector operation form. To describe how this floating point architecture may be implemented into the processing system 100 refer now to the following description.

Figure 6:
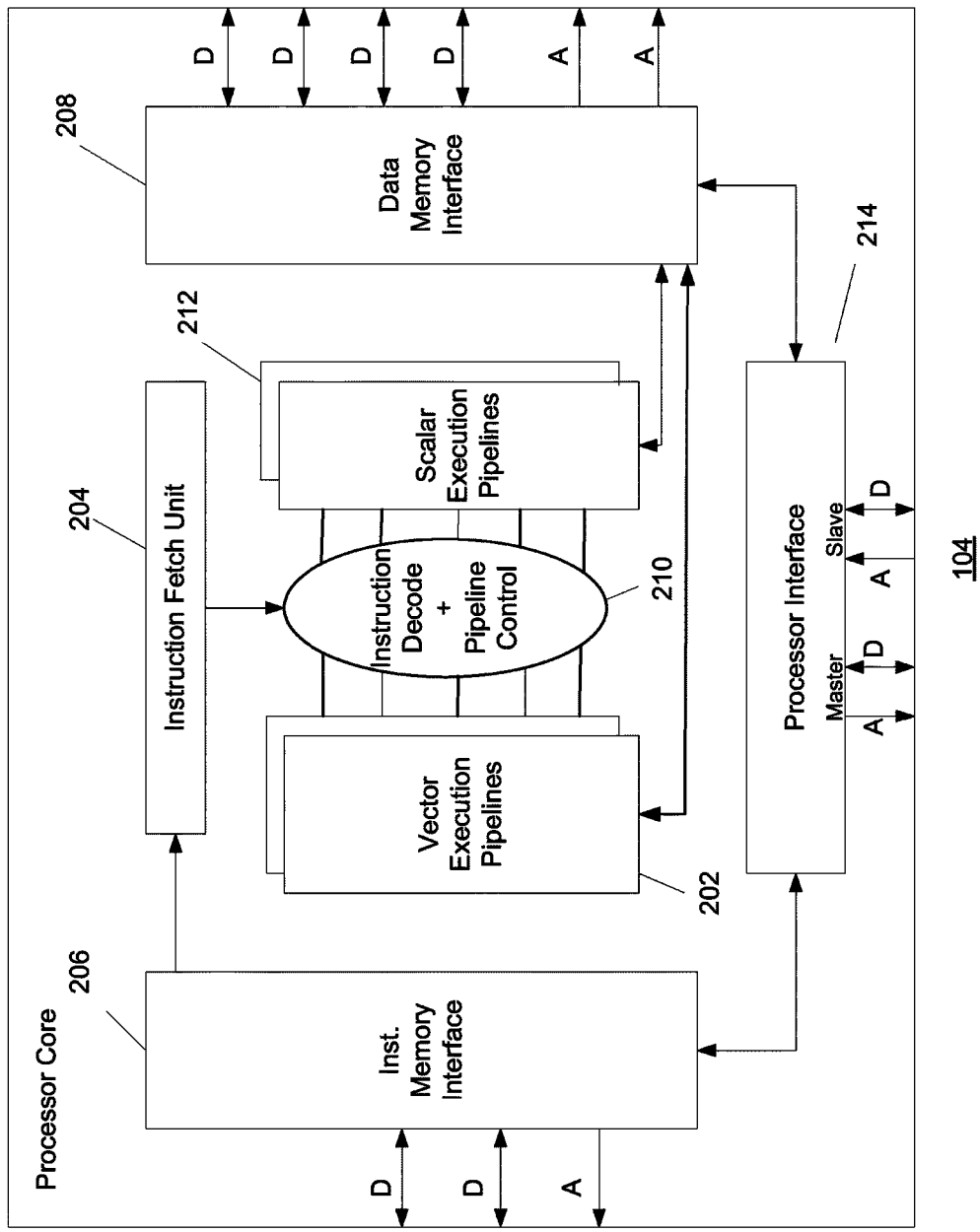
FIG. 6 is a block diagram of an embodiment of a processor core of the processing system of FIG. 1.

FIG. 6 is a block diagram of an embodiment of a processor core 104 of the processing system of FIG. 5. The processor core 104 includes an instruction memory interface 206 which is in communication with the plurality of instruction memory banks 102 (FIG. 5) and a data memory interface 208 that is in communication with the plurality of data memory data banks 106 (FIG. 5). Both memory interfaces 206 and 208 are coupled to the processor interface 214.

An instruction fetch unit 204 receives instructions from instruction memory interface 206. The instruction fetch unit 204 provides the instructions to instruction decode and pipeline control 210. The instruction decode and pipeline control 210 is coupled to a plurality of vector execution pipelines 202 and a plurality of scalar execution pipelines 212. The data memory interface 208 exchanges data with both the plurality of vector execution pipelines 202 and the plurality of scalar execution pipelines 212.

In a system and method in accordance with an embodiment, floating point operations share most of the register files, execution units and pipeline structures with common fixed-point architecture features in a same digital signal processor (DSP), allowing the processor core 104 to execute both fixed point and floating point operations with high throughput and low hardware cost. The key floating point operations are typically implemented as a short sequence of more primitive operations, often scheduled in different operation issue slots within VLIW architecture, to enable parallel execution. When implemented in a vector architecture, as in the example system, it offers much-better-than-fixed point precision for the typical multiplication and addition operations with little added cost relative to a 16-bit fixed point DSP architecture implementation. To describe this in more detail refer now to FIG. 7.

Figure 7:
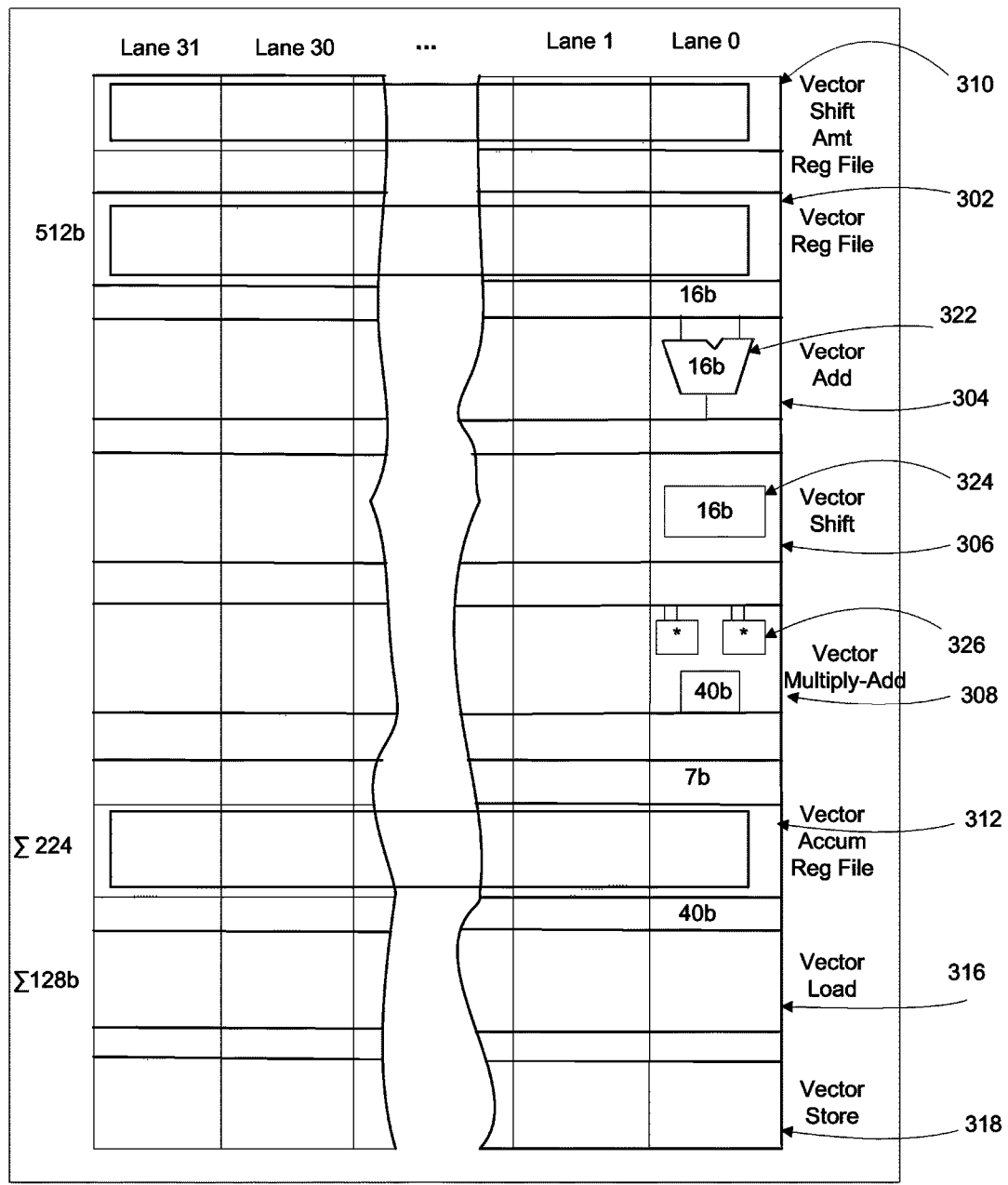
FIG. 7 illustrates a vector execution unit pipeline of FIG. 2 in more detail.

FIG. 7 illustrates a vector execution unit pipeline 202 of FIG. 6 in more detail. The vector execution unit pipeline 202 in this embodiment comprises for example 32 lanes (lanes 0-lane 31). Additionally each lane in an example produces a plurality of register file and execution units that range from 7 bits to 40 bits wide. In an embodiment, each of the lanes includes a plurality of operations. Each lane for example may include a vector register file 302, a vector adder 304, a vector shift 306, a vector multiplier 308, a vector shift amount (VSA) register file 310, a vector accumulator register file 312, a vector load 316, and a vector store 318. In an embodiment, the vector adder 304 includes a 16 bit adder 322. The vector shift block 306 in an embodiment can include a 16 bit shift register 324. The vector multiplier 308 includes at least two multipliers 326.

Figure 8A:
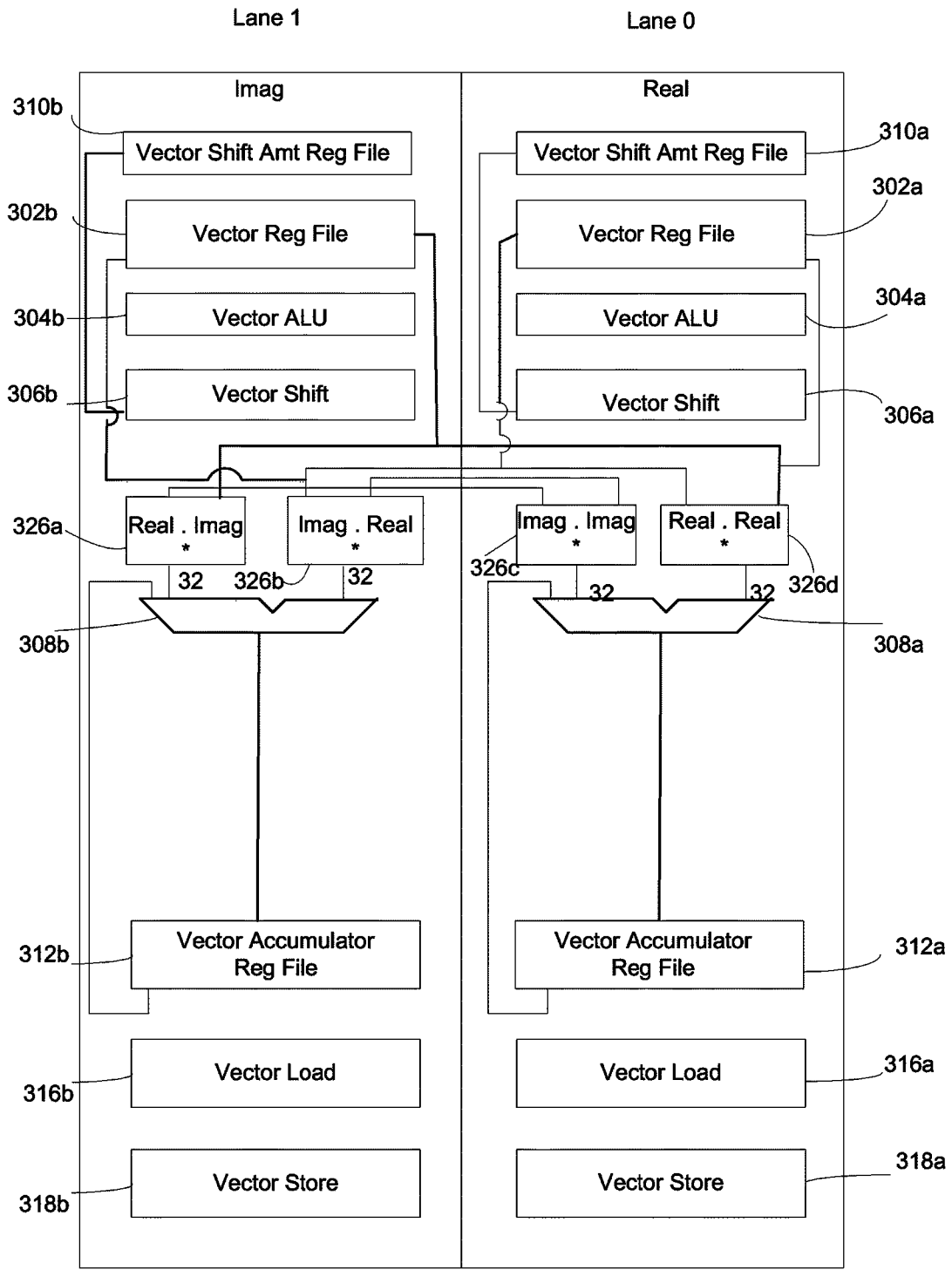
FIG. 8A illustrates lane 0, 1 which includes a plurality of operations to provide a multiply add operation that includes complex numbers accordance with an embodiment.

FIG. 8A is a more detailed example that illustrates lane 0 and lane 1 which includes a plurality of operations to provide a floating point multiply add operation accordance with an embodiment. As is seen, lanes 0 and 1 are utilized to provide imaginary real portion and imaginary portion of a complex number. Lanes 0 and 1 include a vector register file 302a and 302b; a vector arithmetic logic unit (ALU) 304a and 304b, a vector shift 306a and 306b, two it multipliers 326a and 326b, 326c and 326d, an adder 308a and 308b, and vector shift amount (VSA) register file 310a and 310b, a vector accumulator register file 312a and 312b, a vector load 316a and 316b, and a vector store 318a and 318b. The vector register file 302b and 320a are coupled to the multipliers 326a, 326b, 326c and 326d which in an embodiment are for example 16×16 bit multipliers with 32 bit results. The vector shift 306a and 306b are coupled to vector shift amount register file 310a and 310b. The outputs of the multipliers 326a and 326b are provided to the adders 308b. The outputs of the multipliers 326c and 326d are provided to the adder 308a. The adder 308b is coupled to the vector accumulator register file 312b. The adder 308a is coupled to the vector accumulator register file 312a. In this manner Lane 0 and lane 1 are coupled together to provide floating point results.

Common Exponent

A system and method in accordance with an embodiment utilizes a common exponent shared between the real and imaginary parts of a complex value. If one component magnitude is significantly less than the other, it may be shifted down in order to correctly reflect the overall value with the common exponent. This shared exponent method avoids the need to compare exponents and relative product mantissa shifts when performing complex multiplies, because input A real exponent plus input B real exponent always equals input A imaginary exponent plus input B imaginary exponent and input A real exponent plus input B imaginary exponent always equals A imaginary exponent plus input B real exponent.

Lazy Normalization for the Accumulation of Multiply Add

A system and method utilizes for example, lazy normalization for the accumulation of add or multiply-add operations using this architecture. Each new addend is shifted to account for differences in exponent (relative denormalization), then added/subtracted. Unlike conventional floating point implementations, the result is not immediately normalized, but left in denormalized form until a series of accumulations are complete.

Due to additions, the data values in the accumulator register file 312a or 312b may grow, with the leftmost bit of significance moving higher in the word, creating the risk of overflow. Due to subtractions, and hence cancellation of bits of significance, the accumulator register file 312a or 312b may shrink, with the leftmost bit of significance moving lower in the word. This shrinkage creates the possibility that a later operation could trigger more loss of bits of precision during relative denormalization, than a system with normalization after each accumulation—this would be a form of underflow.

A system and method in accordance with an embodiment, mitigates the risk of overflow and underflow. In addition, the relative denormalization of the accumulator register file and new addend can be an expensive shift operation, as either one could require a large right shift (up to the full width of the operand).

Figure 8B:
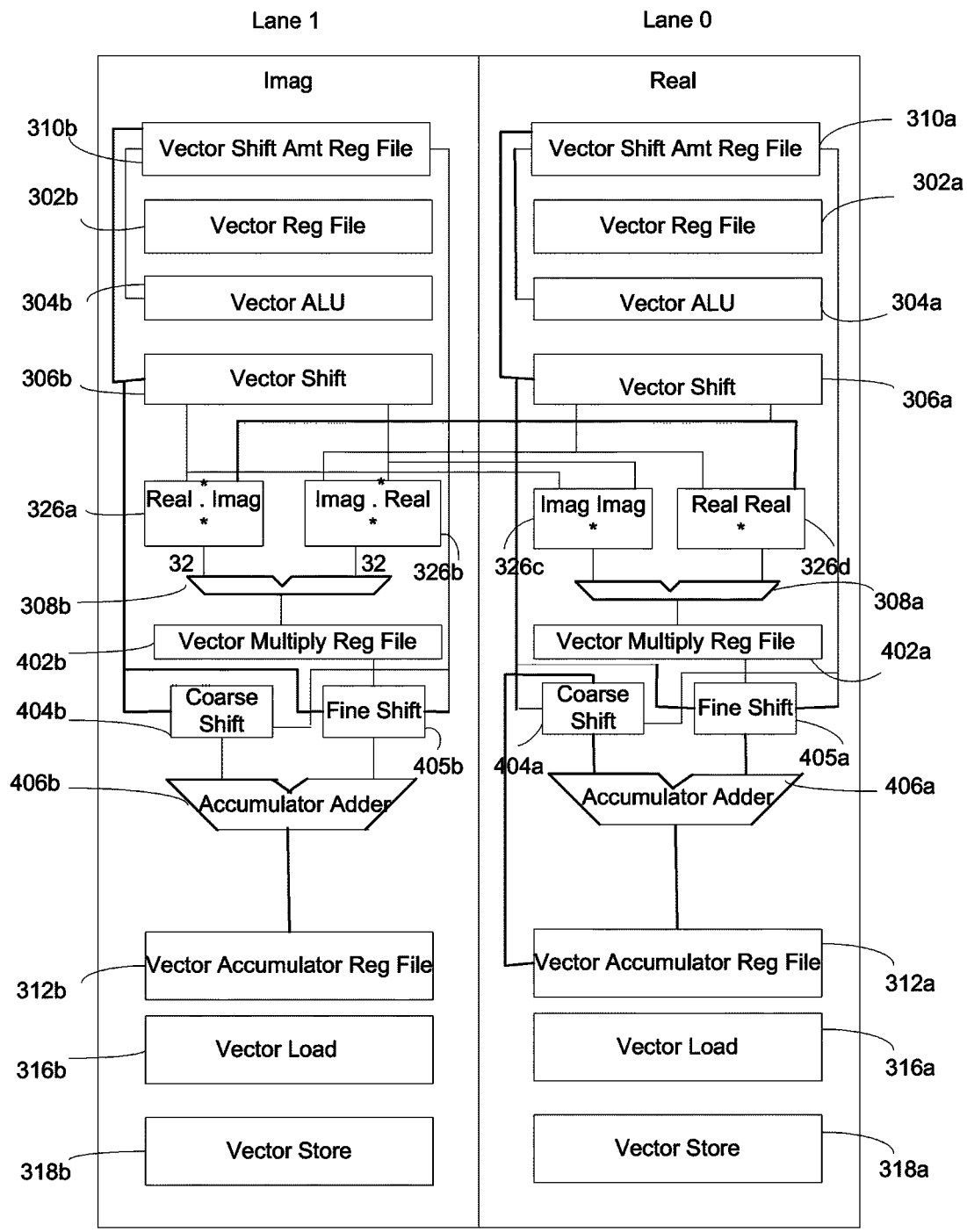
FIG. 8B illustrates lane 0, 1 as in FIG. 4A which includes operations to minimize the underflow or overflow of the accumulator register during multiply add operations.

FIG. 8B illustrates lane 0, 1 as in FIG. 8A which includes operations to minimize the underflow or overflow of the vector accumulator register file 312a or 312b during multiply add operations. In an embodiment, the system and method utilizes a fine granularity shifter 404a or 404b (arbitrary left/right shift for any shift amount in the range for example of 40 bits left to 40 bits right) to shift the new addend, and specifies a new coarse granularity shifter 404a or 404b (for example from 0 to 32 bits by multiplies of 4 bit positions) to shift the vector accumulator register file 312a or 312b.

When a next relative for the vector accumulator register file 312a or 312b is not a multiple of 4, the vector accumulator register file shift 312a or 312b amount is converted to a multiple of 4, and the new addend shifted by 1 to 3 positions to make up the difference. However, this leaves a choice about whether the absolute shift moves the two operands 1 to 3 bits to the left or to the right—i.e. is the shift bias left or right. A system and method in accordance with the present embodiment examines the most significant few bits in the vector accumulator register file 312a or 312b (6 bits in one typical implementation) to determine if the vector accumulator register file 312a or 312b is growing in significance towards overflow.

If it is, the shift is biased to the right, giving the vector accumulator register file 312a or 312b more guard-bits on the left of future accumulations. If the top bit of a value in the vector accumulator register file 312a or 312b (for example the top 6 bits) all match the sign bit, then the shift is biased to the left, reducing the number of guard bits and taking the vector accumulator register file 312a or 312b closer to being normalized. In this way, the vector accumulator register file 312a or 312b behaves like a normalized accumulator register file, but no normalization shift is required after each add.

Denormalization Provided Utilizing Two Multiplies Per Lane

A system and method utilized the two multiplies per lane to provide denormalization in floating point add and subtract operations. Floating point adds and subtracts require relative denormalization before the add/sub operation. The difference of exponents of the two operands is computed, and the mantissa of the smaller magnitude value must be shifted right by that difference. A method and system in accordance with an embodiment utilizes two multipliers 326 for each vector lane (e.g. 2 16×16-bit multipliers per lane) to implement the shifts on one or the other of the two input mantissas. The shift difference is converted into a power-of-2 operand to the multipliers 326, effectively right shifting that operand, before the add/subtract operation (which uses the standard adder for accumulation). In this way a floating point value is split between a shift amount and the vector accumulator register.

In an embodiment, core arithmetic operations on floating point inputs (multiply, add) are separated from the renormalization operations, so that they generally occur in different slots. By this separation the reuse of existing hardware is maximized in the key arithmetic operations and for the renormalization shift, without increasing the pipeline length of the processor—a problem in some floating point implementations. Furthermore, in an embodiment for a multiply-add operation, the multiply operation is separated from the add operation. This allows including a relative denormalization step in the add pipeline. In an embodiment, the multiply, the add, and the renormalization operations are all mapped to different issue slots, so all can execute in parallel.

Separation of Core Arithmetic Operations from Renormalization Operations

A system and method in accordance with an embodiment separates core arithmetic operations from the renormalization operations. In an embodiment, special normalization operations are utilized to prepare for reciprocal determinations such as reciprocal number and reciprocal square root number approximations. The preparation instruction for reciprocal square root examines the incoming exponent and potentially denormalizating the mantissa, and performs a shift appropriate to forming an input to an approximation instruction in the range (1.0,0.25)], and an exponent that is a multiple of two, so that the exponent of the square root result, which naturally involves a divide-by-two, can be computed exactly.

A set of exponent manipulation operations are provided to allow for scaling, swapping, duplicating, adding, subtracting, shifting and finding minimum and maximum exponent values. The set of exponent manipulation operations enable efficient power operations and manipulation of exponents in mixed real and complex value computations. The instruction set also includes conversions between real and complex forms, and between IEEE single precision and this reduced cost floating point format. To describe the features of the present invention in more detail refer now to the following description in conjunction with the accompanying figures.

Example Implementation in a Processor Instruction Set

An example implementation of the advanced precision floating point group is described below. In an embodiment the advanced precision floating point group is in a five slot format. For example, those five slots can be allocated to the following operations:

Slot 0: vector stores and base operations

Slot 1: vector loads, base operations and boolean operations

Slot 2 accumulator register file operations

Slot 3: multiplies into multiply register file

Slot 4: ALU operations and exponent operations

By utilizing these representations, the advanced precision floating point group allows for a variety of new instructions that allow for increased efficiency. These operations include but are not limited to:

1. Major operations
2. Conversions to and from IEEE single-precision floating point operations
3. Multiply operations
4. Exponent operations
5. Multiply result shift and accumulator operations
6. Overflow and underflow detections operations

CONCLUSION

In a system and method in accordance with the present invention a form of floating point representation and associated processor operations, including efficient complex number representations and operations is utilized. The new form of floating representations provides an improved tradeoff between numerical accuracy and efficiency in implementation and operation execution. An example implementation on a vector digital signal processing (DSP) enabled peak execution rates of 16 complex multiply-add operations per cycle, in parallel with other DSP operations. This represents the equivalent of 16×4 floating point multiplies and 16×4 floating point adds per cycle, or 128 floating point operations per cycle, with an semiconductor implementation area, and energy level similar to that for 128 16-bit fixed point operations per cycle.

A system and method in accordance with an embodiment is applicable to problem domains like wireless signal processing that use complex number representations. For example the system and method may also be easily applied to domains like audio and image processing and industrial control, where more than 16-bit fixed point precision is often needed, but where cost and power are critical considerations.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention. Any theory, mechanism of operation, proof, or finding stated herein is meant to further enhance understanding of the present invention and is not intended to make the present invention in any way dependent upon such theory, mechanism of operation.

What is claimed is:

1. A computer implemented method for performing floating point operations, the computer implemented method comprising:
   providing, in a processor that includes fixed point operations, a group of instructions within the processor that includes a floating point representation in a memory of the processor wherein the floating point representation comprises an exponent and mantissa each of which includes real and imaginary components, wherein the floating point representation utilizes a common exponent for the real and imaginary components of the floating point representation, wherein at least one of the real and imaginary mantissa components of the floating point representation is normalized.

2. The computer implemented method of claim 1, wherein a first exponent value is reserved for zero independent of a mantissa value and a second exponent value is reserved for a value outside a range of directly representable values independent of the mantissa value.

3. The computer implemented method of claim 1, wherein exponent comparison and product mantissa shifts are not performed when performing complex multiplies.

4. A computer implemented method for performing floating point operations, the computer implemented method comprising:
   providing, in a processor that includes fixed point operations, a group of instructions within the processor that includes a multiply add floating point operation, wherein an accumulator of the multiply add floating point operation leaves a result of the multiply add floating point operation in denormalized form in a memory of the processor until a plurality of accumulations are completed by the processor.

5. The computer implemented method of claim 4, wherein a magnitude of a mantissa value in the accumulator is detected to determine underflow or overflow of the accumulator.

6. The computer implemented method of claim 5, wherein the detection is provided by utilizing a fine granularity shifter and a coarse granularity shifter to minimize relative denormalization of a component before an add/subtract operation.

7. The computer implemented method of claim 6, wherein the fine granularity shifter shifts in a range of 40 bits to the left and 40 bits to the right.

8. The computer implemented method of claim 6, wherein the coarse granularity shifter shifts 0 to 32 bits by multiplies of 4 bit positions.

9. The computer implemented method of claim 6, wherein two multipliers per lane of a vector execution pipeline are utilized in a denormalization of the floating point add/subtract operation to implement the shifts on one or the other of two input mantissas from the multiply-add floating point operation.

10. A computer implemented method for performing floating point operations, the computer implemented method comprising:
   providing in a processor that includes fixed point operations, a group of instructions that includes (i) core arithmetic operations including multiply and add, and (ii) renormalization operations different from the core arithmetic operations, the renormalization operations preparing input operands in a memory of the processor for reciprocal determinations b the processor.

11. The computer implemented method of claim 10, wherein the renormalization operations include prenormalization of a mantissa of the floating point number and adjustment of an exponent value of the floating point number and an estimation of a result mantissa.

12. The computer implemented method of claim 10, wherein the reciprocal determinations comprise any of determining a reciprocal of a value and a reciprocal of a square root of a value.

13. The computer implemented method of claim 12, wherein the renormalization operations include a preparation instruction determining the reciprocal square root, wherein an incoming exponent is examined and a mantissa is denormalized based upon the examined incoming exponent, and the preparation instruction performs a shift forming an input to an approximation instruction in a predetermined range and to an exponent that is a multiple of two, so that an exponent of a square root result is computable.

14. The computer implemented method of claim 13, the predetermined range is between 1.0 and 0.25.

15. A computer implemented method for performing floating point operations, the computer implemented method comprising:
   providing, in a processor that includes fixed point operations, a group of instructions within the processor that includes a floating point operations group, wherein the floating point operations group comprises at least three sub-groups of operations including a first of the at least three sub-groups that comprises multiply operations that write into a first programmer visible register within the processor; a second of the at least three sub-groups of operations that comprises shift-and-accumulate operations that utilize the first programmer visible register as a source and performs a variable shift and an add or a subtract to or from a second programmer visible register within the processor; and a third of the at least three sub-groups of operations that comprises helper operations that add and subtract shift amounts in a third programmer visible register within the processor.

16. The computer implemented method of claim 15, wherein the three sub-groups of operations are issued in parallel.

17. A computer implemented system for performing floating point operations, the computer implemented system comprising:
   a group of instructions within a processor that includes fixed point operations, wherein in the group of instructions a single shared exponent value in a memory of the processor is applied to both real and imaginary components of a floating point value, so that each floating point value has one exponent and two mantissas; and
   at least two programmer visible registers; wherein the floating point value is split between two programmer visible registers.

18. The computer implemented system of claim 17, wherein the at least two programmer visible registers comprise a shift amount register and a fixed point data register.

19. The computer implemented system of claim 17, wherein the group of instructions performs a floating point computation utilizing two mantissas and only one exponent.

20. The computer implemented system of claim 17, wherein the group of instructions includes instructions issuing floating point multiply operations, multiply-add operations, and add operations one cycle per vector lane of a vector execution pipeline.

21. The computer implemented system of claim 17, wherein the group of instructions includes instructions separating core operations on floating point inputs from renormalization operations.

22. The computer implemented system of claim 17, in which the group of instructions includes a set of exponent manipulation operations that allow for scaling, swapping, duplicating, adding, subtracting, shifting and finding minimum and maximum exponent values.

23. The computer implemented system of claim 20, wherein the group of instructions includes instructions mapping multiply, the add, and the renormalization operations to different issue slots, wherein the multiply, add and renormalization operations are executed in parallel.

* * * * *

UNITED STATES PATENT AND TRADEMARK OFFICE
CERTIFICATE OF CORRECTION

| | | |
|---|---|---|
| PATENT NO. | : 9,619,205 B1 | Page 1 of 1 |
| APPLICATION NO. | : 14/295818 | |
| DATED | : April 11, 2017 | |
| INVENTOR(S) | : Rowen et al. | |

It is certified that error appears in the above-identified patent and that said Letters Patent is hereby corrected as shown below:

On the Title Page

Item [72], replace "Teodur" with "Teodor"

Signed and Sealed this
Fifth Day of September, 2017

Joseph Matal
*Performing the Functions and Duties of the*
*Under Secretary of Commerce for Intellectual Property and*
*Director of the United States Patent and Trademark Office*